Patented July 5, 1938

2,122,790

UNITED STATES PATENT OFFICE 2,122,790

TREATMENT OF PARAFFIN HYDRO-CARBONS

Hans Tropsch, Chicago, Ill., assignor to Universal Oil Products Company, Chicago, Ill., a corporation of Delaware No Drawing. Application August 24, 1935, Serial No. 37,752

8 Claims. (Cl. 260—170)

This invention relates to the treatment of paraffin hydrocarbons which are normally gaseous, including ethane, propane and the butanes.

In a more specific sense, the invention is concerned with a process for converting these low boiling members of the paraffin series of hydrocarbons into their corresponding olefins which contain two atoms of hydrogen less per molecule and consequently have one double bond between carbon atoms.

There is a large commercial production of gaseous paraffin hydrocarbons. They occur in very large quantities in natural gas, particularly those gases associated with the production of crude oil and commonly known as casinghead gases, and this supply is further augmented by the gases produced in cracking oils for the production of gasoline, although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives on account of the unreactive character of its components in comparison with their olefinic counterparts.

In one embodiment, the invention comprises the dehydrogenation of gaseous paraffin hydrocarbons at elevated temperatures in the presence of catalysts comprising essentially magnesium oxide supporting minor additions of chromium trioxide.

In the present instance, the catalysts which are preferred for selectively dehydrogenating the lower boiling paraffinic hydrocarbons have been evolved as the result of a large number of experiments with catalysts having a dehydrogenating action upon various types of hydrocarbons such as are encountered in the fractions produced in the distillation of petroleum and other naturally occurring hydrocarbon oil mixtures. The criterion of an acceptable dehydrogenating catalyst is that it shall split off hydrogen without inducing either carbon separation or scission of the bonds between carbon atoms. In the present invention, catalyst mixtures comprising major amounts of magnesium oxide and minor amounts of chromium trioxide are used. While magnesium oxide alone is a fairly good dehydrogenating catalyst in the above sense, its tendency to selective splitting off of hydrogen on the one hand has been found to be increased, and its tendency to carbon deposition on the other hand has been found to be lessened by the use of the present specific activator so that the dehydrogenating action is rendered more definite and effective.

The mineral magnesite from which magnesium oxide is conveniently prepared to furnish base material for the present type of catalyst is most commonly encountered in a massive or earthy variety and rarely in crystal form, the crystals being usually rhombohedral. In many natural magnesites, the magnesium oxide may be replaced to the extent of several percent by ferrous oxide. The mineral is of quite common occurrence and readily obtainable in quantity at a reasonable figure. The pure compound begins to decompose to form the oxide at a temperature of 350° C. (663° F.), though the rate of decomposition only reaches a practical value at considerably higher temperatures, usually of the order of 800° C. (1472° F.) to 900° C. (1652° F.). This mineral is related to dolomite, the mixed carbonate of calcium and magnesium, this latter mineral, however, not being of as good service as the relatively pure magnesite in the present instance. Magnesium carbonate prepared by precipitation or other chemical methods may be used alternatively in place of the natural mineral, thus permitting its use as the active constituent of masses containing spacing materials of relatively inert character and, in some cases, allowing the production of catalysts of higher efficiency and longer life.

Chromium trioxide having the formula $CrO_3$ is the anhydride of chromic acid and may be prepared by decomposition of chromates by sulfuric acid. It crystallizes in scarlet rhombic prismatic needles having a specific gravity of 2.788 which melt at 193° C. without decomposition. When heated, further oxygen is evolved and red vapors of the oxide. The anhydride is very soluble in water, 100 parts of which dissolve 62 parts by weight of the oxide at 26° C. The oxide is a powerful oxidizing agent and may assist in the dehydrogenating reactions involved in the process by virtue of this property.

In making up catalyst composites of the preferred character and composition, the following is the simplest and generally the preferred procedure. Natural magnesite is calcined at temperatures of from 800° C. (1472° F.) to 900° C. (1652° F.) to produce a mixture containing a high percentage of magnesium oxide. The oxide is then ground to produce granules of relatively small mesh and these are given the requisite amounts of chromium trioxide by mixing them with fairly dilute aqueous solutions thereof. The magnesium oxide resulting from calcination has a high absorptive capacity for dissolved compounds and readily takes up the required percentages of chromium trioxide from aqueous solutions. To insure complete absorption of the chromium trioxide from the solutions and at the same time a uniform distribution upon the magnesium oxide granules, the latter may be added to relatively dilute solutions and these may then be concentrated until a critical point is reached corresponding to complete removal of dissolved material. At this point, the solvent may be removed by filtering or pressing or evaporation by heat.

The mineral oxide of magnesium may sometimes be employed as base material (this oxide being known as Periclase) whenever the same is readily available and its physical properties as well as its content of impurities permits. The mineral oxide occurs in granular form or in definite cubic or octahedral crystals and may contain in many cases, besides relatively inert siliceous gangue materials, small amounts of iron and manganese replacing a portion of the magnesium.

In regard to the relative proportions of magnesium oxide and chromium trioxide, it may be stated that the latter is always used in minor proportion and generally in amounts corresponding to less than 10% by weight of the total promoted catalyst. The degree of activation with a given percentage of chromium trioxide will vary somewhat with the paraffin gas mixture being treated and also the same percent addition of promoters may have different influence upon the dehydrogenation of any given mixture of paraffinic gases.

In practicing the dehydrogenation of paraffinic gases according to the present process, a solid composite catalyst prepared according to the foregoing alternative methods is used as a filler in a reaction tube or chamber in the form of particles of graded size or small pellets, and the gas to be dehydrogenated is passed through the catalyst after being heated to the proper temperature, usually within the range of from 400° to 750° C. (752–1382° F.). The most commonly used temperatures are around 500° C. (932° F.), e. g., 900–1000° F. The catalyst tube may be heated exteriorly if desired to maintain the proper reaction temperature. The pressure employed may be atmospheric or slightly superatmospheric of the order of from 50 to 100 pounds per square inch. While pressures up to 500 pounds per square inch may be employed in some cases, pressures of the order of atmospheric are preferred. The time during which the gases are exposed to dehydrogenating conditions in the presence of the preferred catalyst is comparatively short, always below twenty seconds, and preferably as low as from three to six seconds.

The exit gases from the tube or chamber may be passed through selective absorbents to combine with or absorb the olefin or olefin mixture produced, or the olefins may be selectively polymerized by suitable catalysts, caused to alkylate other hydrocarbons such as aromatics or treated directly with chemical reagents to produce desirable and commercially valuable derivatives. After the olefins have been removed, the residual gases may be recycled for further dehydrogenating treatment with or without removal of hydrogen.

The present types of catalysts are selective in removing two hydrogen atoms from a paraffin molecule to produce the corresponding olefin without furthering to any great degree undesirable side reactions, and, because of this, show an unusually long period of activity in service, as will be shown in later examples. When, however, their activity begins to diminish, it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particles and decrease their efficiency. It is characteristic of the present types of catalysts that they may be repeatedly regenerated without loss of porosity or catalyzing efficiency.

Numerous experimental data could be adduced to indicate the results obtainable by employing the present type of catalyst to dehydrogenate paraffins, but the following single example is sufficiently characteristic.

In making up the catalyst for the catalytic dehydrogenating operation, 100 parts by weight of 6–10 mesh burned magnesite particles were added to 100 parts by weight of a 5% solution of chromium trioxide in water at room temperature. After stirring for a few moments, the supernatant liquid was decanted and the particles were dried at a temperature of approximately 220–230° C. By this procedure, the major portion of the dissolved chromium trioxide was absorbed by the magnesium oxide particles.

Using the granular catalyst particles prepared as above described, isobutane was passed through a treating tower containing them as filler at atmospheric pressure and temperatures of about 1112° F., with a space velocity of from 50 to 80 per hour.

The following table shows the nature of the results obtained by means of gas analyses taken at indicated times from the start of the run:

*Composition of dehydrogenated gases*

| Time after start, hours | 40 | 80 | 150 | 250 |
|---|---|---|---|---|
| i-Butylene, percent | 24.6 | 23.5 | 24.6 | 24.6 |
| Other butylenes and propylene, percent | 6.3 | 5.2 | 5.4 | 5.9 |
| Ethylene, percent | 2.2 | 2.3 | 4.6 | 2.1 |
| Paraffins (mainly i-butane), percent | 35.0 | 37.1 | 35.4 | 38.4 |
| Hydrogen, percent | 31.9 | 31.9 | 30.0 | 29.0 |

From the above data, it will be seen that the dehydrogenation corresponds closely to the calculated equilibrium mixture at 1112° F., which should contain approximately 33% hydrogen, 33% butane and 33% butylenes. Substantially 50% of the original isobutane was converted into olefins and hydrogen.

It is to be further observed that the catalytic activity was maintained substantially constant for the period of a run of approximately ten days.

The foregoing specification and example are sufficient to show that the invention has intrinsic value when practiced in the art, but neither is to be construed as imposing limitations upon the scope of the invention, as both are given for illustrative purposes only.

I claim as my invention:

1. A process for the treatment of normally gaseous paraffin hydrocarbons to produce the corresponding olefin hydrocarbons which comprises subjecting said normally gaseous paraffin hydrocarbons to the action of magnesium oxide and chromium trioxide under conditions adequate to partially dehydrogenate the same.

2. A process for the treatment of normally gaseous paraffin hydrocarbons to produce the corresponding olefin hydrocarbons which comprises, subjecting said normally gaseous paraffin hydrocarbons to the action of magnesium oxide and chromium trioxide at a temperature of from approximately 750° to 1380° F., to partially dehydrogenate the same.

3. A process for the treatment of normally gaseous paraffin hydrocarbons to produce the corresponding olefin hydrocarbons which comprises, subjecting said normally gaseous paraffin hydrocarbons to the action of a catalyst comprising essentially a major amount of magnesium oxide and a minor amount of chromium trioxide at a temperature of from approximately 750° to 1380° F., to partially dehydrogenate the same.

4. A process for the treatment of normally gaseous paraffin hydrocarbons to produce the corresponding olefin hydrocarbons which comprises, subjecting said normally gaseous paraffin hydrocarbons to the action of magnesium oxide supporting minor additions of chromium trioxide at a temperature of from approximately 750° to 1380° F., to partially dehydrogenate the same.

5. A process for the treatment of normally gaseous paraffin hydrocarbons to produce the corresponding olefin hydrocarbons which comprises, subjecting said normally gaseous paraffin hydrocarbons to the action of magnesium oxide and chromium trioxide at a temperature of from approximately 750° to 1380° F., for a contact time between three and twenty seconds, to partially dehydrogenate the same.

6. A process for the conversion of normally gaseous hydrocarbons into olefin hydrocarbons which comprises, subjecting said normally gaseous paraffin hydrocarbons to the action of a mixture of magnesium oxide and chromium trioxide at a temperature of from 900° to 1000° F., for a contact time of from three to six seconds to convert the gaseous paraffin hydrocarbons to olefin hydrocarbons.

7. A process for converting paraffinic into unsaturated hydrocarbons which comprises subjecting the paraffin hydrocarbon to dehydrogenating conditions in the presence of magnesium oxide supporting a relatively small but sufficient amount of chromium trioxide to promote the catalytic activity of the magnesium oxide.

8. A process for converting gaseous paraffin hydrocarbons into their corresponding olefins which comprises subjecting the paraffin hydrocarbon to dehydrogenating conditions in the presence of magnesium oxide supporting a relatively small but sufficient amount of chromium trioxide to promote the catalytic activity of the magnesium oxide.

HANS TROPSCH.